United States Patent [19]

Vanderwal, Jr.

[11] 4,227,310
[45] Oct. 14, 1980

[54] HEADS FOR GAGING DEVICES AND FIXTURE FOR SETTING SAME

[75] Inventor: Frank E. Vanderwal, Jr., St. Louis, Mo.

[73] Assignee: Sunnen Products Company, St. Louis, Mo.

[21] Appl. No.: 890,127

[22] Filed: Mar. 27, 1978

[51] Int. Cl.³ .............................................. G01C 3/34
[52] U.S. Cl. ........................... 33/178 R; 33/178 B; 33/168 B
[58] Field of Search ............ 33/178 R, 178 B, 164 B, 33/168 B

[56] References Cited

U.S. PATENT DOCUMENTS

| | | | |
|---|---|---|---|
| 2,210,124 | 8/1940 | Parrish | 33/178 R |
| 2,741,850 | 4/1956 | Reed | 33/178 R |
| 2,835,040 | 5/1958 | D'elia | 33/167 |
| 3,123,914 | 3/1964 | Haluska | 33/167 |

FOREIGN PATENT DOCUMENTS 124475 3/1949 Sweden.
942528 11/1963 United Kingdom.

Primary Examiner—Willis Little
Attorney, Agent, or Firm—Charles B. Haverstock

[57] ABSTRACT

A gaging head for the in process gaging of a surface such as a cylindrical surface while it is being honed, ground, or machined by a device which increases the diameter thereof, said head having a work engaging portion of a size and shape to accurately test measure the diameter of the surface, a portion for attaching it to a gaging device, and an adjustment feature for adjusting the work engaging portion to increase the preset accuracy thereof. The present invention also resides in a novel fixture for preadjusting the subject gaging heads.

15 Claims, 27 Drawing Figures

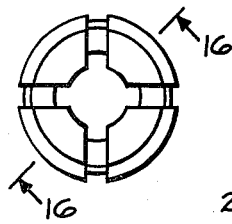 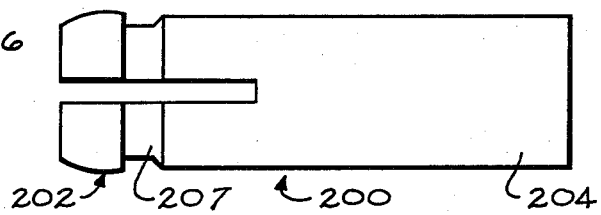 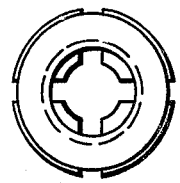
FIG. 14  FIG. 13  FIG. 15
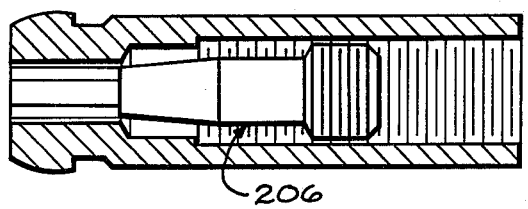
FIG. 16
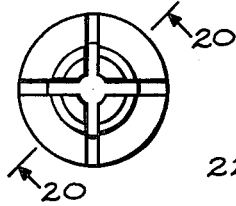 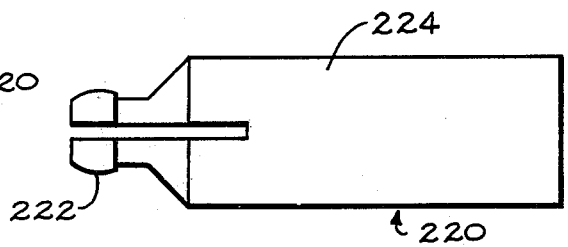 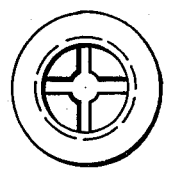
FIG. 18  FIG. 17  FIG. 19
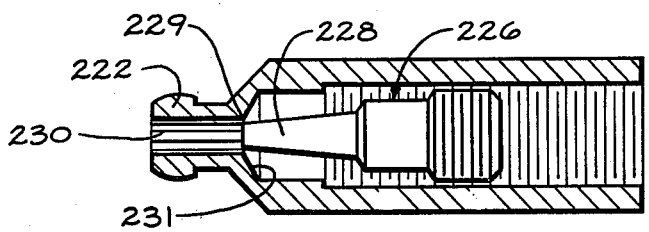
FIG. 20

HEADS FOR GAGING DEVICES AND FIXTURE FOR SETTING SAME

Many gaging devices have been constructed and used in the past to measure the diameter of a work surface during operation thereon. Some of the devices are used by inserting portions thereof into the work surface as the work progresses. These may include gaging devices which are separate instruments apart from the devices which work on the parts being gaged, and they may include on them means that enter the work surface at times when the operation being performed is interrupted. Other known devices may be used as in process gaging devices which periodically sample or measure the work surface while it is being operated on, and some devices are known which periodically sample and measure the tool which is operating on the work surface. Some of the known devices employ fluid pressure means, some measure pressure differentials, some employ optical devices, and others employ various mechanical devices such as feelers and the like. All of the known devices have certain shortcomings, limitations and disadvantages which have limited or restricted their usefullness or are inaccurate or unreliable. Also the known devices have not been adaptable for use with a wide variation in the diameter of surfaces being gaged, they have been difficult and time consuming to use and to adjust, most of the known devices have required external equipment such as separate energy sources which make them expensive and costly to construct and to install and use, and many of the known devices have required auxiliary equipment such as air and fluid lines and sources and the like. Furthermore, the known devices have not provided uniform results, have been difficult and time consuming to use, and require special training and experience to operate satisfactorily. These and other shortcomings, limitations, and disadvantages of the known devices are overcome by the present construction which is specifically adapted in all of its embodiments for in process gaging. The present devices are also relatively simple structurally and can be quickly and easily installed and placed in operating condition, they are capable of being adjustable to extreme accuracy and close tolerances, and the present gaging head constructions can be made in a wide variety of sizes to cover a wide range of hole diameters, and all of the different sizes of the device can be installed for use on the same in process gaging device.

It is therefore a principle object of the present invention to provide an improved gaging head construction for use on in process gaging devices.

Another object is to improve the uniformity of surfaces and particularly cylindrical surfaces that are honed, ground and otherwise machined.

Another object is to teach the construction and operation of a gaging head which can be adjusted within limits to extremely accurately gage surfaces.

Another object is to teach the construction of a gaging head which can be installed quickly and easily on in process gaging devices.

Another object is to teach the construction of a relatively simple, easy to use fixture for accurately presetting gaging heads.

Another object is to increase the accuracy of surfaces on parts that are honed, ground, and machined.

Another object is to simplify the construction and operation of gaging means for use on devices for the in process gaging of cylindrical work surfaces.

These and other objects and advantages of the present invention will become apparent after considering the following detailed specification which discloses and describes several preferred embodiments of an in process gaging head as shown in the accompanying drawings, wherein:

FIG. 13 is a side elevational view of another embodiment of the subject gaging head;

FIG. 14 is a left end view of the gaging head of FIG. 13;

FIG. 15 is a right end view of the gaging head of FIG. 13;

FIG. 16 is a cross-sectional view taken on line 16—16 of FIG. 14;

FIG. 17 is a side elevational view of another gaging head;

FIG. 18 is a left end view of the gaging head of FIG. 17;

FIG. 19 is a right end view of the gaging head of FIG. 17;

FIG. 20 is a cross-sectional view taken on line 20—20 of FIG. 18;

Figure 2:
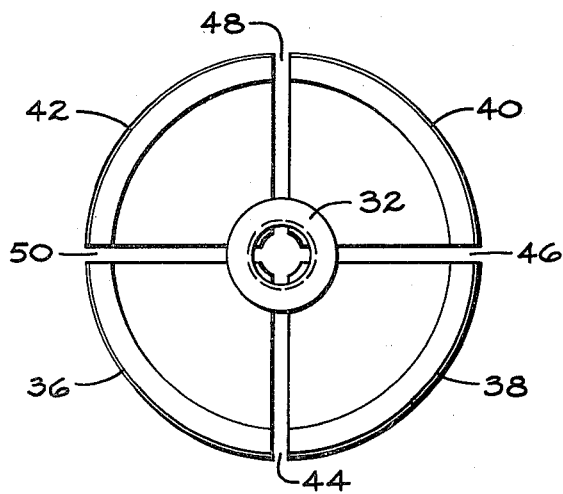
FIG. 2 is a top view of the gaging head of FIG. 1.

Referring to the drawings more particularly by reference numbers, number 30 refers to one form of a gaging head for use on a gaging device such as those disclosed in co-pending U.S. patent application Ser. No. 872,577, filed Jan. 26, 1978, now U.S. Pat. No. 4,192,073, and assigned to applicant's assignee. Several different embodiments of the subject gaging head are disclosed herein and are designed to be used with an in processing gaging device such as those disclosed in the co-pending application. All of the embodiments are interchangeable and can be attached to the gaging device by suitable means such as by being threaded onto a suitable threaded member or the like. Furthermore, all of the subject gaging heads can be constructed to have the same axial length so that no adjustment as to length is usually necessary.

Figure 1:
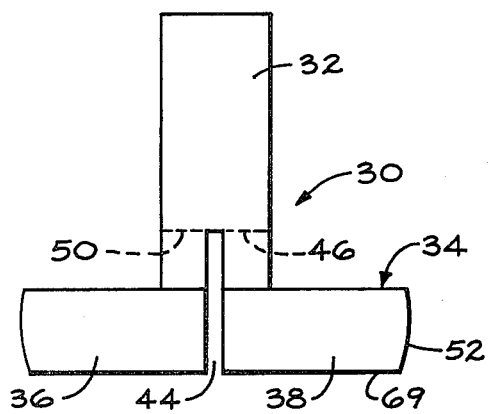
FIG. 1 is a side elevational view of one embodiment of a gaging head constructed according to the teachings of the present invention.

The gaging head 30 includes a tubular portion 32 and an integral gaging portion 34. The gaging portion 34 as shown in FIG. 1 is formed by four similar quadrature portions 36, 38, 40 and 42. The adjacent quadrature portions are separated from each other by spaces formed by slots 44, 46, 48 and 50 which extend partway into the tubular portion 32 as clearly shown in FIGS. 1 and 2. All four of the quadrature portions 36-42 are preferably of similar shape having curved outer surfaces 52 which are shown as slightly smaller in diameter adjacent to the free end of the gaging head 30.

The tubular portion 32 has a threaded inner surface 54 which extends from the end opposite the gaging portion 34 along most of the length of tubular portion 32. The threaded passage 54 communicates with a cylindrical bore portion 56, and the cylindrical portion 56 communicates with a transition surface 57 which in turn communicates at edge 59 with smaller diameter segmented cylindrical bore portion 58 which extends through the rest of the hub portion 32. An adjustment member 60 having a threaded portion 62 which cooperates with the threaded passage 54 is positioned inside the tubular portion 32. The adjustment member 60 has a central cylindrical portion 64 which is connected at one end to the threaded portion 62 and at the opposite end to one end of a tapered portion 66. The tapered outer surface of the portion 66 makes contact with the juncture or edge 59 between the conical surface 57 and the cylindrical surface 58 during adjustment as will be shown. The free end of the threaded portion 62 also has a socket 68 for receiving a wrench member such as an Allen wrench (not shown) which is used in adjusting the position of the member 60.

Figure 4:
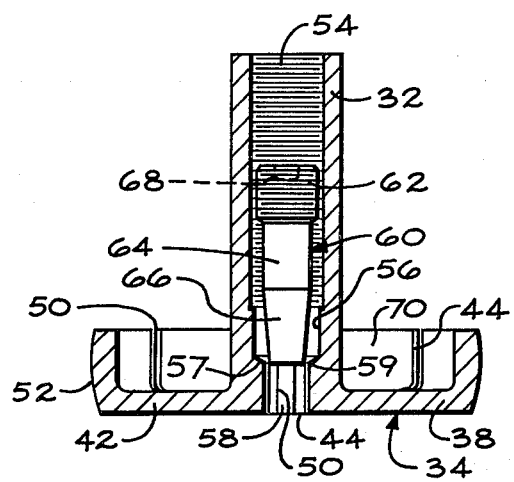
FIG. 4 is a cross-sectional view taken on line 4—4 of FIG. 3.
Figure 3:
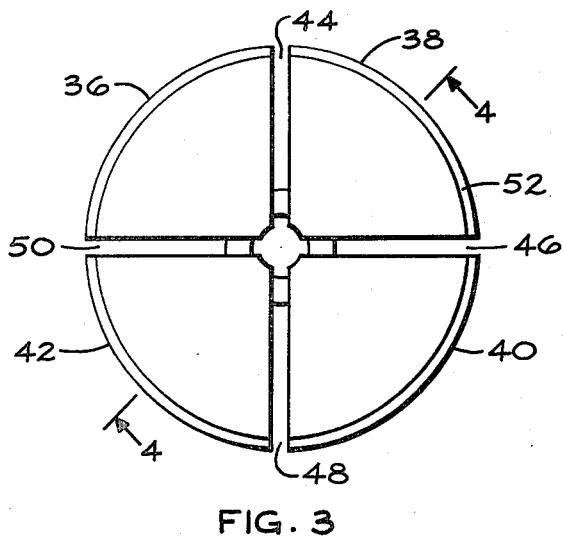
FIG. 3 is a bottom view of the gaging head of FIG. 1.

The gaging portion 34 is shown having a flat end surface 69. The opposite side of the gaging head 34 and of the portions 36-42 are shown hollowed out by an annular groove 70 (FIG. 4), although this is an optional feature and its use will depend on the size of the head involved.

During construction of the subject head, the outer annular curved surface 52 is accurately formed so that the diameter thereof has some precisely known desired dimension. As shown, the surface 52 is made to be somewhat smaller in diameter adjacent to the flat surface 69. The shape of the surface 52 is such that adjustments of the member 60 will not undesirably distort the contour in all positions thereof. Adjustment is made by threading the adjusted member 60 into the threaded passage 54 and turning the member 60 using an Allen wrench until the tapered surface 66 engages the segmented juncture 59 between the surface 57 and the surface 58. Thereafter any further adjustment of the member 60 will move the quadrature portions 36-42 radially outwardly to increase the diameter of the portion 34. Adjustment in this manner will also make the gaging portion 34 slightly non-round so that only portions of the segments will actually engage the work. This is not undesirable, and in this way a very precise gaging dimension can be achieved, and this can be accurately determined by using suitable means such as a setting fixture or the like. A setting fixture for this purpose may include a ring gage, or a fixture such as the fixture shown in FIGS. 26 and 27.

Figure 5:
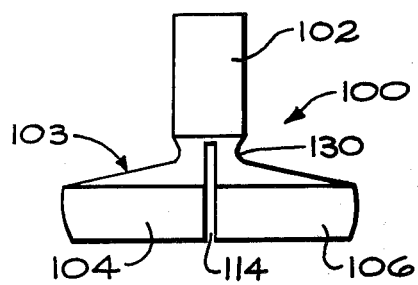
FIG. 5 is a side elevational view showing another embodiment of the subject gaging head.
Figure 6:
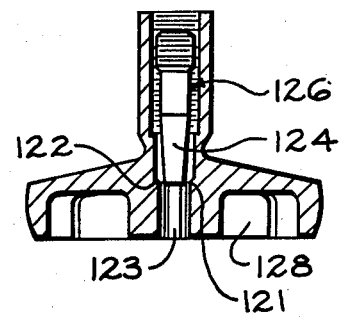
FIG. 6 is a cross-sectional view similar to FIG. 4 but of the head shown in FIG. 5.

FIGS. 5 and 6 show a modified embodiment 100 of the subject gaging head. The modified embodiment 100, like the embodiment 30, includes a threaded tubular portion 102 and an integral gaging portion 103 formed by four quadrature portions or segments 104, 106, 108 and 110 which are separated from each other by spaces 114, 116, 118 and 120 which are extensions of grooves which extend partway into the adjacent end of the tubular portion 102. The threaded passage in the modified head 100 includes a segmented edge 121 formed at the juncture of surface 122 and cylindrical surface 123. The edge 121 cooperates during adjustment with tapered end portion 124 of adjustment member 126. In the modified construction 100 annular groove 128 is formed in the free end of the gaging portion 103 rather than in the opposite side thereof as in the construction shown in FIGS. 1-4. The embodiment 100 also has a reduced diameter portion 130 at the location where the tubular portion 102 and the gage portion 103 meet. The spaces 114-120, only one of which is numbered, are similar to the grooves 44-50 in the construction of FIGS. 1-4 and extend through the reduced diameter portion 130 and this provision makes it somewhat easier for the segments 104-110 to move or bend outwardly when the threaded member 126 is moved against the edge 121. Except for the differences noted above, the modified gage head of FIGS. 5-6 is similar to and operates in a manner similar to the gage head 30.

Figure 7:
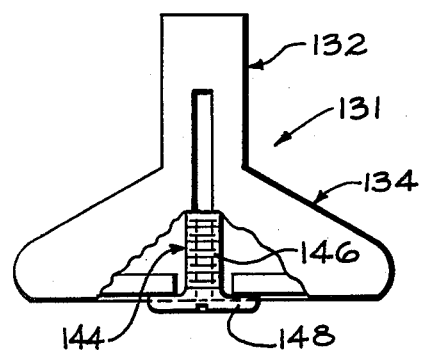
FIG. 7 is a side elevational view showing another gaging head embodiment but with the adjustment feature being accessible from the opposite end of the device.
Figure 8:
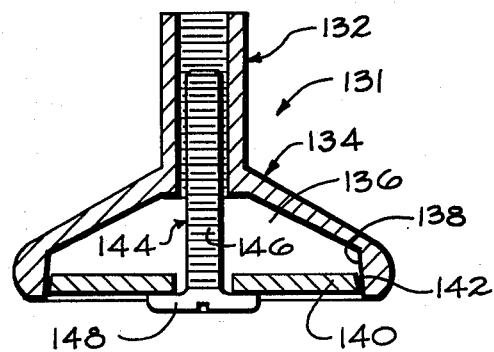
FIG. 8 is a cross-sectional view similar to FIG. 4 of the modified head of FIG. 7.
Figure 10:
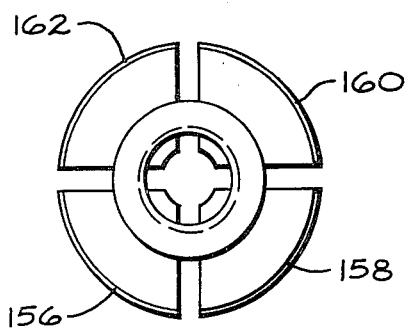
FIG. 10 is a top plan view of the gaging head of FIG. 9.
Figure 9:
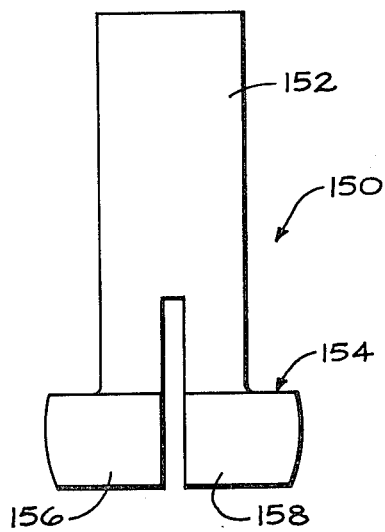
FIG. 9 is a side elevational view of another embodiment of the subject gaging head.
Figure 12:
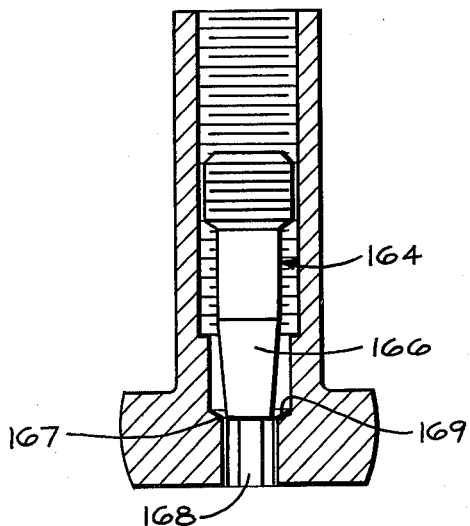
FIG. 12 is a cross-sectional view taken on line 12—12 of FIG. 11.
Figure 11:
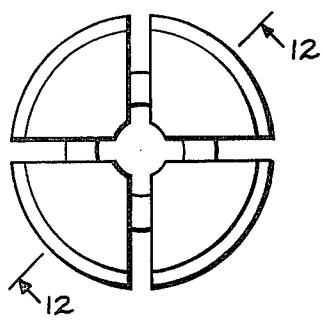
FIG. 11 is a bottom view of the gaging head of FIG. 9.

FIGS. 7 and 8 show another modified embodiment 131 of the subject gage head wherein similar principles are involved but wherein adjustment is made by means accessible from the gaging end of the head rather than from the tube end of the device. In this case the gage head 131 has a threaded tube portion 132 and an integral segmented gage portion 134. The gage portion 134 has a cavity 136 formed therein in part by an annular tapered surface 138. An annular disc or washer 140 having a tapered outer surface 142, is positioned in the cavity 136 with the tapered outer surface 142 thereof in engagement with the tapered surface 138. Note that the taper of the surface 142 is preferably made to be somewhat steeper than the taper of the surface 138 to facilitate adjustment. A threaded member or bolt 144, having a threaded portion 146 that engages the threads in the tubular portion 132 and a head portion 148, is also provided. The head portion 148 of the member 144 engages one side of the washer 140 and is provided with a screwdriver slot or other like means that are engageable therewith when making adjustment. By adjusting the threaded member 144 the tapered outer surface 142 of the washer 140 slides on the tapered cavity surface 138 and in so doing increases the diameter of the gaging portion 134.

FIGS. 9-12 show another embodiment 150 of a gaging head which although similar to the gaging head shown in FIGS. 1-4, differs therefrom in that it is designed and constructed to gage somewhat smaller diameter surfaces. The modified embodiment 150 has a threaded tubular portion 152 and an integral gaging portion 154 formed by four segmented quadrature portions 156, 158, 160 and 162. In this embodiment the quadrature gaging portions 156-162 are too small to permit being hollowed out. Except for this difference, however, the modified construction 150 is similar to and operates in a similar manner to the heads 30 and 100. In this regard, note that the tubular portion 152 receives a threaded adjusted member 164 (FIG. 12) which has a tapered end portion 166 that cooperates with the segmented juncture 167 of surfaces 168 and 169 formed in the quadrature portions 156, 158, 160 and 162.

FIGS. 13-16 show yet another embodiment 200 of a gaging head which is used for gaging still smaller diameter surfaces. In this case the gaging portion 202 and the threaded tubular portion 204 are of the same or similar diameter, and in this case the threaded adjustment 206 is constructed and operates similarly to the threaded adjustment members described above. Note also that the gage head 200 has an annular groove 207 similar to the groove 130 in the construction shown in FIG. 5.

FIGS. 17-20 show still another embodiment 220 of the subject gaging head. In this case the head 220 differs from the other embodiments because the gaging head portion 222 is of even smaller diameter than threaded tubular portion 224. Because of this, the construction of adjustment member 226 is modified to provide a smaller diameter tapered end portion 228 for cooperation with the segmented juncture 229 of surface 230 and surface 231. This is necessary because of the more limited space available in the gaging head portion 222. By having the threads in the tubular portions in all of the various embodiments the same there is total interchangeability and replaceability of the various heads on the male threaded portion of the gaging device on which they are used. This means that some interchangeability of the adjustment members is also possible. These are important practical advantages and ones which enable the same gaging device to be used with a number of different heads to gage a large range of hole sizes by selecting the desired head size. The modified construction 220 is constructed and is operated and adjusted in the same manner as the constructions previously discussed.

FIGS. 21-25 show another modified embodiment 300 of the subject gaging device. The modified embodiment 300 is designed and constructed to provide a broad range of gage head adjustment using the same head, and while retaining many of the same advantages including precise adjustment, interchangeability, and use of the same gaging device used for the other head embodiments. The modified embodiment 300, like the other embodiments, has a threaded tubular portion 302 which receives a threaded adjustment member 304. The threaded tubular portion 302 is connected integrally with a gaging head portion formed by quadrature portions 306, 308, 310 and 312, which are spaced from each other by spaces 314, 316, 318 and 320. Each of the quadrature portions 306-312 is defined by a respective flange portion 322, 324, 326 and 328 (FIG. 23), and each of the flanges 322-328 has formed thereon a flat outer face 330, 332, 334 and 336. The flanges 322-328 also have respective threaded holes 338, 340, 342 and 344 through them as clearly shown in FIG. 23.

Each of the threaded holes 338-344 receives a respective threaded gaging member 346, 348, 350 and 352 and these members have similar head portions 354, 356, 358 and 360 which are shown as being hexagonal shaped to cooperate with a wrench or like tool (not shown) used in adjusting them. The heads 354-360 also have rounded outer surfaces 362, 364, 366 and 368 which are the surfaces that make contact with the work during a gaging operation. Each of the members 346-452 also carries an associated lock nut 370, 372, 374 and 376 which is locked into engagement with the respective flat surfaces 330-336 to lock the gaging members 346-352 in predetermined conditions thereon.

Figure 22:
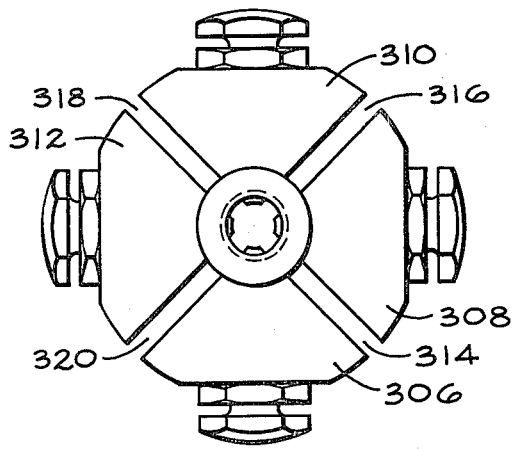
FIG. 22 is a top plan view of the gaging head of FIG. 21.
Figure 21:
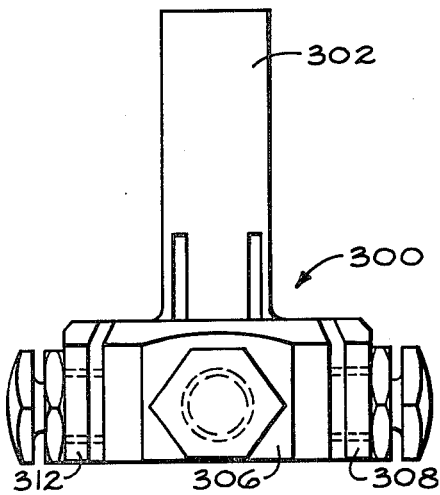
FIG. 21 is a side elevational view showing yet another embodiment of the subject gaging head.
Figure 24:
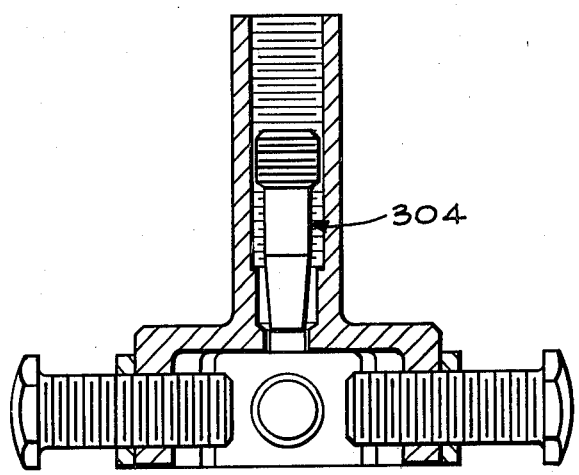
FIG. 24 is a cross-sectional view taken on line 24—24 of FIG. 23 but showing somewhat longer adjustable work engaging members in extended positions.
Figure 23:
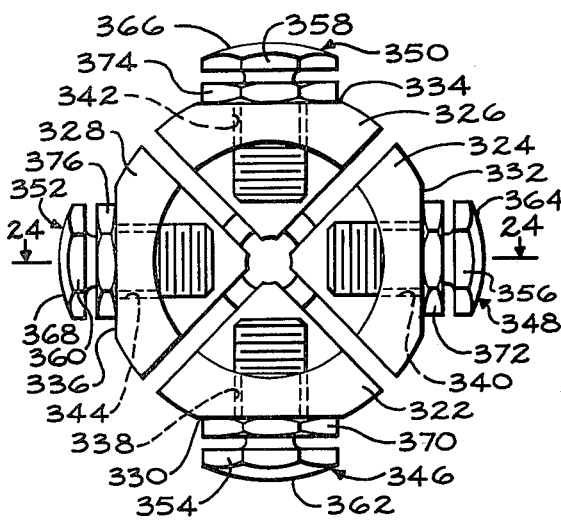
FIG. 23 is a bottom plan view of the gaging head of FIG. 21.
Figure 25:
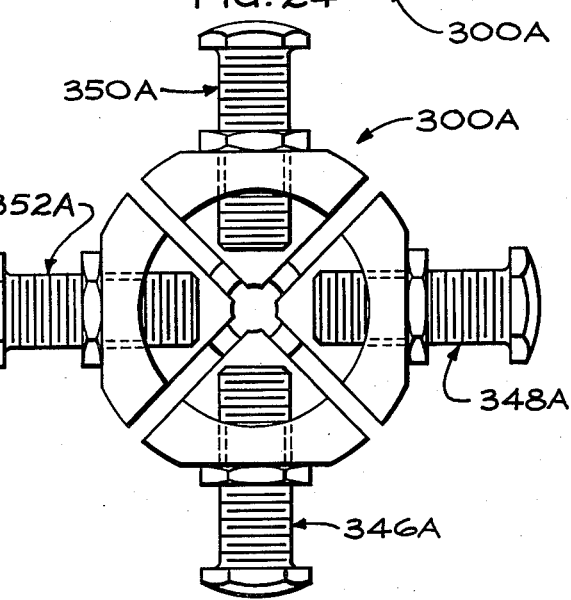
FIG. 25 is a bottom plan view of the gaging head shown in FIG. 24.

FIGS. 24 and 25 show a construction 300A similar to that shown in FIGS. 21-23 but with adjustable gaging members 346A-352A shown as being longer than the gaging members 346-352 on the construction 300 to cover even larger diameter bores.

Figure 26:
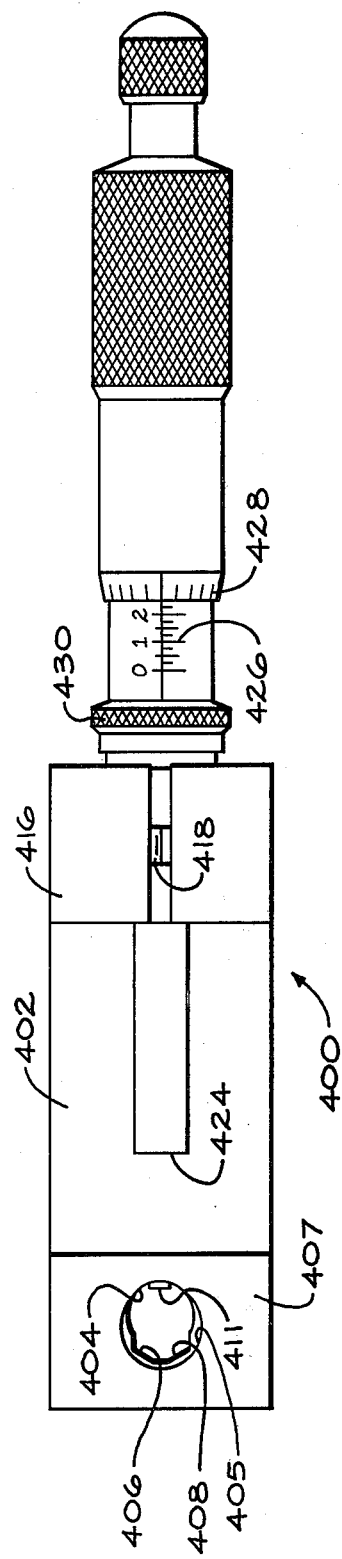
FIG. 26 is a top view of a fixture for use in setting the subject gaging heads; and, FIG. 27 is a side elevational view of the setting fixture of FIG. 26.
Figure 27:
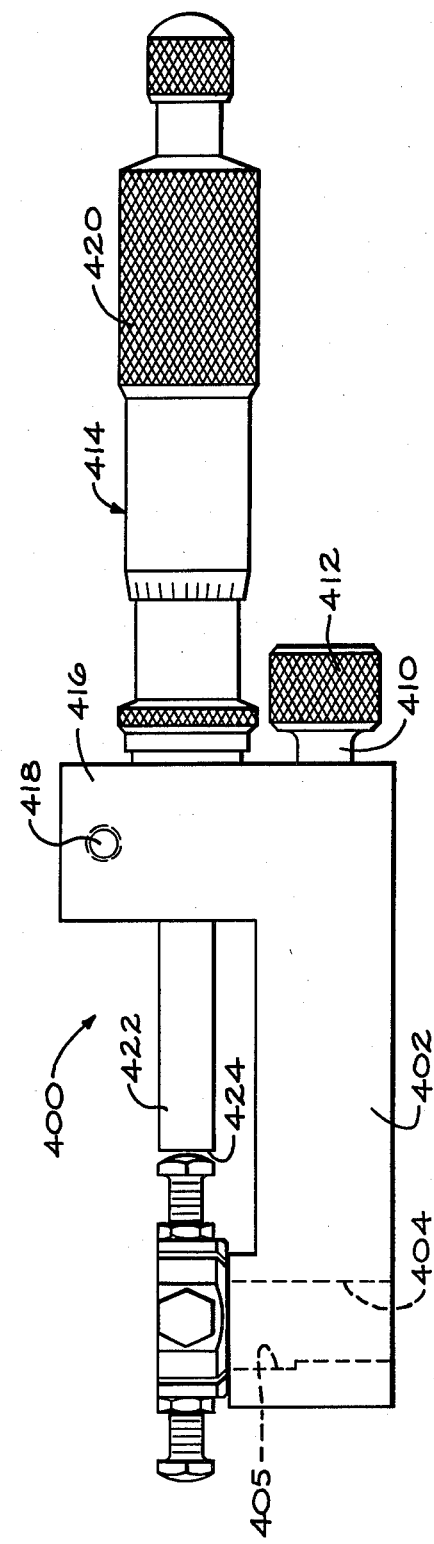

When adjusting the subject head 300 (or 300A), the head is mounted on a setting fixture 400 (FIGS. 26 and 27) which includes a base portion 402 with an opening or bore 404 formed therein. The bore 404 is larger in diameter than the diameter of the tubular portion 302 (or tubular portions 32, 102, 152, 204 and 224) so as to be able to easily receive the tubular portion 302 when inserted therein. A counter bore 405 that is larger in diameter than the bore 404 extends partway into the base 402 from the upper surface as clearly shown in FIG. 27. The counter bore 405 is provided to prevent the slotted portion of the tubular head portion such as the slotted portion of the tube 302, which is the portion adjacent to the gaging portion, from being positioned in engagement with the bore 404 which otherwise could adversely affect adjustment. In the usual situation the head to be adjusted is positioned in the bore 404 with the gage portion resting on the upper surface 407 of the fixture 400. The bore 404 is larger in diameter than the tubular head portion 302 and the bore 404 has formed therein a pair of angularly related flat surfaces 406 and 408 located as shown in FIG. 26. When the tubular gage portion 302 is inserted into the bore 404 it is moved against the flat surfaces 406 and 408 by means of a threaded member 410 which has an end surface 411 that is adjusted to bear against the tubular head portion 302 to hold it in place. The member 410 also has a knurled knob portion 412 which is used by the operator to lock and unlock the head in position. This construction makes it possible to accurately locate the head to be adjusted in the fixture 400. Obviously the fixture 400 could alternatively be provided with a male threaded member similar to the threaded member on the in process gaging device on which the subject heads are positioned when in use, but this could slow down the adjustment procedure and would be less convenient.

When the head 300 is installed on the fixture 400, as described, the rounded surfaces 362-368 are each centered in turn on the axis of a micrometer setting device 414 that is mounted on upstanding portion 416 of the fixture 400 by being positioned in a suitable opening provided therefor. The micrometer 414 is then locked in position on the portion 416 by a threaded member 418 which extends between spaced parts of the portion 416. The micrometer 414 has relatively rotatable portions 420 and 422, one of which is rotatable by the operator and the other of which moves axially and has an end surface 424 which is the fixture gaging surface. The end surface 424 can be set to any desired dimension within the range of the fixture 400 and of the head to be adjusted, and if the head being adjusted is one like that shown in FIGS. 21-25 the rounded surfaces 362-368 of each of the gaging members 346-352 are set one at a time during adjustment of the head 300. This is done by aligning the members 346-352 with the end surface 424. When each of the members 346-352 is properly aligned it is adjusted until its rounded surface abuts the surface 424, and then it is locked in position by tightening the appropriate lock nut 370-376 while holding the head portion against rotation. This is a relatively simple procedure and one which can be accomplished quickly and accurately. This adjustment procedure greatly expands the range of possible settings for each such gaging head. Furthermore, the procedure of adjusting the head can be repeated from time to time to compensate for wear of the work engaging portions, to change the surface portions that come in contact with the work and to change the gaging diameter. The same procedure is also followed when replacing the gaging members 346-352.

The micrometer 414 has cooperating scales 426 and 428 which enable the surface 424 to be accurately set to any desired dimension. The micrometer 414 also has a knurled portion 430 which can be used to accurately locate it on the portion 416. The fixture 400 can be used to preset any of the various heads disclosed in this application. However, in the case of the heads disclosed in FIGS. 1-20 the head adjustments will be made using an Allen wrench, a screwdriver or some like tool instead of other types of wrenches. As indicated above, as the diameter of the heads shown in FIGS. 1-20 is increased they become less round which means that the center of the work engaging surfaces of the quadrature gage head portions will be the portions that engage the work and that also engage the end surface 424 on the micrometer 414 during adjustment. If desired, the depth of the bore 404 can be selected or made adjustable to center the work engaging portions of the various heads on the micrometer end surface 424.

All of the various gage head embodiments shown and described herein have gaging portions that are divided into four segments or quadrants. This is done for convenience since it is relatively easy to form grooves that intersect to divide the gaging portion as shown. It is apparent, however, that the gaging heads can also be divided into other numbers of work engaging segments without departing from the spirit and scope of the invention and without losing the adjustability and other features and advantages. For example, the gaging portions could be divided into two spaced portions by a single cross-groove, they could be divided into three spaced segments by appropriately spaced grooves, or they could be divided into any other number of segments as desired.

Thus there has been shown and described several embodiments of a novel head construction for use on in process gaging devices such as those disclosed in copending U.S. patent application Ser. No. 872,557, now U.S. Pat. No. 4,192,073, and a novel fixture for setting said heads, which heads and fixture fulfill all of the objects and advantages sought therefor. It will be apparent to those skilled in the art, however, that many changes, variations, modifications and other uses and applications for the present devices are possible, and all such changes, variations, modifications and other uses and applications which do not depart from the spirit and scope of the invention are deemed to be covered by the invention which is limited only by the claims which follow.

What is claimed is:

1. A head for an in process gaging device comprising integral tube and gaging portions, said tube portion having first and second ends, the first of which is connected to the gaging portion, said tube portion having internal threads over a portion of the length thereof including the portion adjacent the second end, axial extending groove means dividing the gaging portion and the adjacent first tube end portion into at least three spaced segments capable of being deflected radially with respect to the tube portion, means forming an annular segmented adjustment edge in the tube portion inwardly of the gaging portion, each of said segments of the gaging portion having an outer peripheral flange portion with a work engaging surface which surfaces establish the gaging diameter of the head, and an adjustment member having a first portion threadedly engageable with the internally threaded portion of the tube portion and a second axially tapered portion cooperatively engageable with the annular segmented adjustment edge in said tube portion whereby rotation of said adjustment member axially displaces the axially tapered second portion to change the gaging diameter.

2. The head defined in claim 1 wherein the gaging portion is formed by four segments.

3. The head defined in claim 1 wherein each of said segments threadedly receives a radially extending adjustable gaging member.

4. The head defined in claim 3 including means to lock the radially extending gaging members in different positions of adjustment on the gaging portion.

5. The head defined in claim 1 wherein the gaging portion is formed to be round in its unstressed condition and has a substantially annular outwardly facing work engaging surface formed thereon, said gaging portion becoming less round as the gaging diameter is increased.

6. The head defined in claim 1 made of relatively hard, but somewhat resilient material.

7. The head defined in claim 1 wherein each of said plurality of segments has an arcuate outer work engaging surface, each of said segments being substantially pie shaped.

8. A head for an in process gaging device comprising integral tube and gaging portions, said tube portion having opposite ends one of which is connected integrally to the gaging portion, said tube portion having internal threads over a portion of the length thereof and extending to adjacent the end thereof opposite from the gaging portion, at least two axially extending grooves dividing the gaging portion and the adjacent end of the tube portion into at least four adjacent segments capable of being deflected radially with respect to the tube portion, each segment having a peripheral flange, means forming an annular segmented adjustment edge in the tube portion inwardly of the gaging portion, and an adjustment member having a first portion and an axially tapered second portion thereon cooperatively engageable in surface-to-edge contact with the segmented adjustment edge in the tube portion whereby axial movements of the adjustment member when rotated axially displaces the tapered second portion of the adjustment member and effects changes in the gaging diameter.

9. The head defined in claim 8 wherein a plurality of angularly related axial grooves extend through the gaging portion and into the adjacent end of the tube portion, said angularly related grooves dividing the head portion and said adjacent tube end portion into a plurality of spaced segments each of which has an outer surface formed thereon.

10. The head defined in claim 8 wherein the gaging portion has an unstressed round shape, axial adjustment of said tapered second portion of the adjustment member into sliding engagement with the adjustment surface in the tubular member changing the diameter of the gaging portion.

11. A head for an in process gaging device comprising integral first and second head portions, said first portion including means for mounting the gaging head on an in process gaging instrument and said second portion including at least three segments attached to the first portion, each segment being capable of being deflected radially, with respect to the first portion each segment having an outwardly facing work engaging surface formed thereon, means to simultaneously radially reposition the segments to change the gaging diameter of the head, said last named means including a cavity formed inwardly of the work engaging surfaces on the segments, said cavity having an annular inwardly facing segmented tapered surface formed thereon, an adjustment member having a peripheral thereon for cooperatively engaging the inwardly facing segmented annular tapered surface edge-to-surface contact, and means including threaded means to adjust the axial position of the adjustment member to radially reposition the segments.

12. The head defined in claim 11 wherein the means to adjust the axial position of the adjustment member includes a threaded member having a threaded portion threadedly engaged with the first head portion and a head end portion cooperatively engageable with the adjustment member.

13. The head defined in claim 12 wherein the head end portion of the threaded member is accessible adjacent to the second head portion.

14. A fixture for presetting gaging heads having a tubular portion and a gaging portion integral with one end of the tubular portion comprising a base member having first means thereon for mounting a gaging head to be preset, and second means spaced from the first means, a micrometer means having first and second relatively movable portions, said first portion being axially movable relative to the second portion when the second portion is rotated, said second means including means for mounting the micrometer means thereon, said first and second relatively movable micrometer members having cooperatively engageable scales to indicate the position of the first member relative to the mounting means for the gaging head in each position of the second micrometer means, means to lock the gaging head in position on the fixture includes a pair of spaced and angularly related gage head locating surfaces engaged by a gaging head to be preset, and an adjustable locking member located on the fixture base member and movable thereon against the gaging head in a direction to move the gage head against the angularly related locating surfaces and to maintain the gaging head engaged therewith.

15. The setting fixture defined in claim 14 wherein said first means on the fixture base member includes a surface with a hole therein extending from said surface for receiving the tubular gaging head portion, said hole having a greater cross-section adjacent to said surface than more remote therefrom.

* * * * *

UNITED STATES PATENT OFFICE
CERTIFICATE OF CORRECTION

Patent No. 4,227,310  Dated October 14, 1980

Inventor(s) Frank E. Vanderwal, Jr.

It is certified that error appears in the above-identified patent and that said Letters Patent are hereby corrected as shown below:

Column 6, line 2 "452" should be --352--

Signed and Sealed this

Twentieth Day of January 1981

[SEAL]

Attest:

RENE D. TEGTMEYER

Attesting Officer   Acting Commissioner of Patents and Trademarks